(12) United States Patent
Thedford et al.

(10) Patent No.: US 6,536,198 B1
(45) Date of Patent: Mar. 25, 2003

(54) MOISTENING PAD HOLDER AND PAD FOR MOISTENING COTTON PICKER SPINDLES

(75) Inventors: Guy N. Thedford, Naperville, IL (US); Lyle P. Mangen, Bettendorf, IA (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 10/052,857

(22) Filed: Oct. 19, 2001

(51) Int. Cl.[7] .................. A01D 46/16; A01D 46/14
(52) U.S. Cl. ......................... 56/41; 56/50
(58) Field of Search ....................... 56/28, 36, 40, 56/41, 42, 43, 44, 45, 46, 47, 50, 32

(56) References Cited

U.S. PATENT DOCUMENTS

| | | | | |
|---|---|---|---|---|
| 2,654,204 A | | 10/1953 | Grosvenor | 56/41 |
| 2,884,754 A | * | 5/1959 | Bornzin et al. | 56/41 |
| 3,004,376 A | | 10/1961 | Hubbard | 56/41 |
| 3,505,799 A | * | 4/1970 | Fergason | 56/41 |
| 3,546,862 A | | 12/1970 | Fergason | 56/41 |
| 4,461,140 A | * | 7/1984 | Carmi et al. | 56/50 |
| 4,793,127 A | * | 12/1988 | Sheldon, Jr. | 56/41 |
| 4,821,498 A | | 4/1989 | Deutsch et al. | 56/50 |
| 4,905,464 A | | 3/1990 | Thedford | 56/50 |
| 5,722,224 A | | 3/1998 | Sheldon, Jr. et al. | 56/41 |

* cited by examiner

*Primary Examiner*—Thomas B. Will
*Assistant Examiner*—Alicia Torres
(74) *Attorney, Agent, or Firm*—John William Stader; Larry W. Miller

(57) ABSTRACT

A moistening pad for a cotton picker spindle has a rearward end including a hole, and is positioned by the pad holder in a predetermined position over the rearward end of the moistening location for contacting the mounting end of the spindle for applying the moistening liquid. A pad holder includes a mounting element for mounting to a support element of the harvesting unit and a pad support element for holding the pad with the rearward end in the predetermined position over the rearward end of the moistening location when the holder is mounted to the support element.

7 Claims, 4 Drawing Sheets

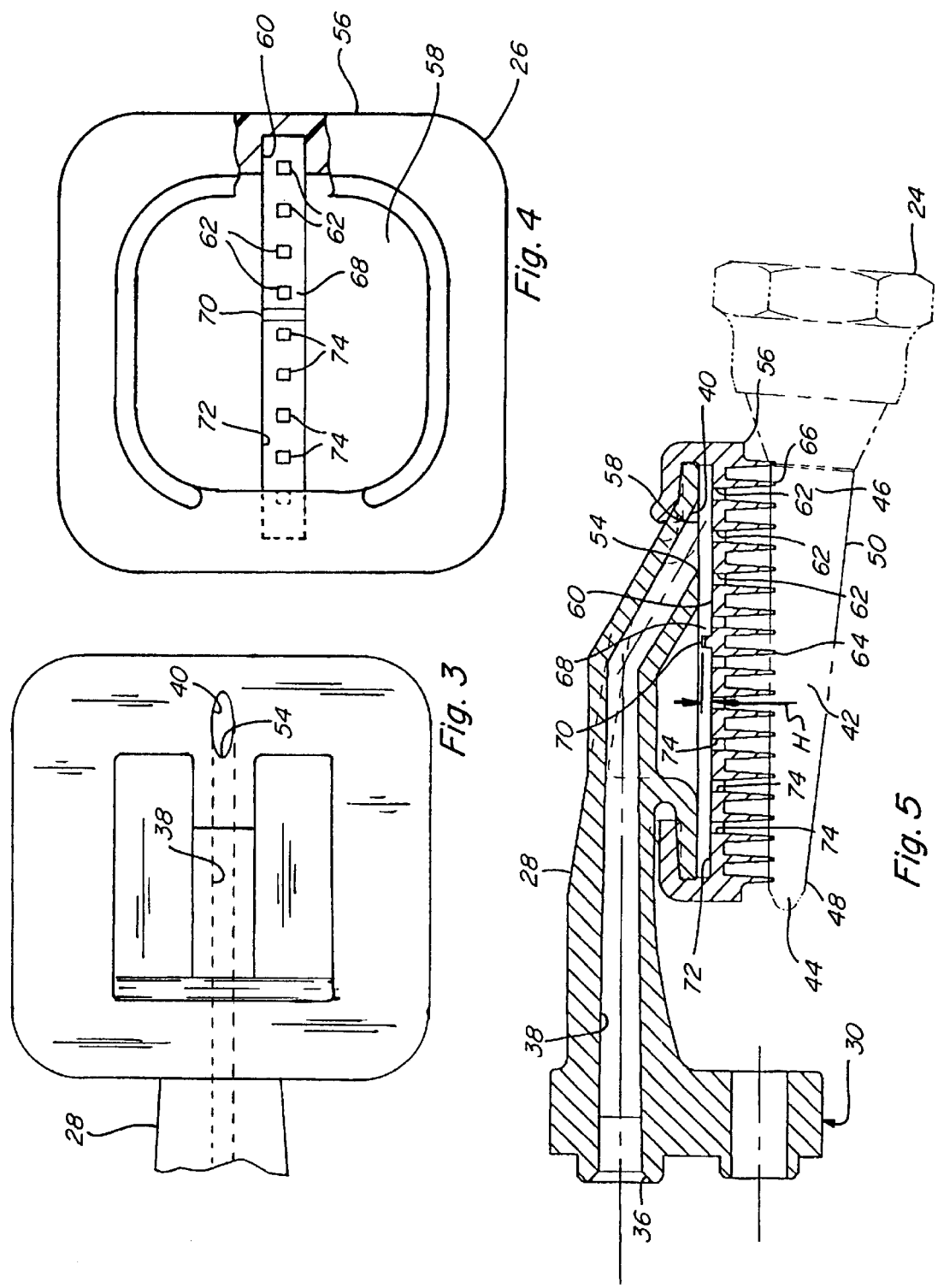

MOISTENING PAD HOLDER AND PAD FOR MOISTENING COTTON PICKER SPINDLES

TECHNICAL FIELD

The present invention generally relates to cotton harvesters and, more particularly, to an improved moistening pad holder and pad for applying a moistening liquid to picker spindles of a cotton harvester row unit, which provides effective moistening liquid distribution to the mounting ends of the spindles.

A typical cotton harvester includes two or more harvesting units for harvesting cotton from rows of cotton plants during a harvesting procedure. Each harvesting unit includes one or more harvesting mechanisms comprised of multiple inter-related parts. One of such mechanisms is a drum having a picker rotor assembly with doffer assemblies arranged ill combination therewith. Each picker rotor assembly includes a series of upright picker bars capable of being moved about their respective upright axes. Each picker bar has a plurality of picker spindles arranged thereon one above the other.

The picker spindles of each picker bar are rotatably driven by a driving arrangement within the picker bar. The picker spindles are each elongate, typically having a tapered or conical outer surface which extends convergingly from an inner or mounting end to a distal or free end thereof, the surface including barbs or otherwise being roughened to enhance affinity thereof for the cotton fibers. During forward motion of the machines the picker spindles are brought into contact with the cotton plants to remove the cotton. The doffer assemblies then remove the cotton from the picker spindles. The doffer assemblies typically include pairs of opposing doffer pads between which the individual picker spindles are passed to remove the cotton therefrom. The picker spindles then pass through a picker spindle moistening assembly including a series of vertically arranged moisture pads supported individually on pad holders mounted on a stand or column proximate to the path of movement of the picker spindles such that the pads are each positioned above a moistening location for applying or adding moistening liquid or fluid to each of the picker spindles before they are introduced to the cotton plants again. The moistening liquid or fluid, which is typically water, serves to cleanse the spindles of dirt, plant juices and other foreign matter which, if allowed to remain on the spindles, can result in a hard, rough surface coating that could diminish picking efficiency. Moistening the surface of the picker spindle onto which the cotton is to be wrapped for extraction from the boll has also been found to increase the picking efficiency. The addition of moisture to the spindles further facilitates subsequent doffing or wiping operations of the cotton from the spindles. In this respect, it is important to apply a metered or measured quantity of moistening liquid to the individual spindles to provide the desired effect, but which is not so much as to add significant moisture to the cotton itself, while compensating for evaporation, leakage, and other losses. Presently, most typically, to achieve the desired measured moistening, the moistening liquid is delivered to the moistening pads through conduits such as tubes and passages at a drip rate under the force of gravity only.

A variety of pad and pad holder constructions for providing the desired moistening have been proposed in the past. Reference in this regard, Deutsch et al. U.S. Pat. No. 4,821,498 issued Apr. 18, 1989 to Deere and Company, which discloses one moistener pad and holder, the pad having an X shape channel extending to the corners of the pad and communicating with passages through the pad for distributing moistening liquid. Reference also Thedford U.S. Pat. No. 4,905,464 issued Mar. 6, 1990 to J.I. Case Company, which discloses another pad and holder, the pad having a K shape channel for distributing moistening liquid over the pad in an attempt to direct more of the liquid to the inner or mounting ends of the picker spindles by placing a greater number of holes through the pad over that region of the spindle.

A problem found with the prior known moistening pad holder and pad arrangements is that it has been observed that when the moistening liquid exits from the outlet of the pad holder onto the pad, the liquid passes through the one or small number of passages or holes through the pad closest to the outlet, and as a result does not reach the more distant passages or holes and the areas of the pad in the vicinity of those holes. This problem is compounded by the typical orientation of the column or stand supporting the moisture pads during the harvesting operation, which is a forwardly inclined tilt, due to a common practice of tilting or inclining the harvesting units downwardly in the forward direction for reaching the cotton plants, which results in the pads also being tilted downwardly toward the forward direction. Because of the downward forward tilting, the drips of moistening liquid supplied to the moisture pads exit from an outlet of the fluid supply tube or passage at the forwardmost edge thereof, which is typically over the forward or center portion of the pad. As a result, although the pads themselves can have a wide variety of numbers of openings therethrough at a variety of locations from the forward to rearward end and from side to side thereon, it has been observed that the fluid will pass through just a few openings nearest or just forwardly of the outlet, such that any openings nearer the rearward end of the pad are not used. Because of the relative front to rear position of the pads relative to the spindles, the fluid will be deposited on about the middle and forwardly located free end of the spindles. Once on the spindles, the fluid has a tendency to move under the centrifugal force in combination with the tapered shape of the spindles toward the free end of the spindles. This results in a lack or shortage of moisture at or adjacent to the inner or mounting end, which has been found to be disadvantageous to the picking efficiency. Thus the problem encountered is that the fluid is not adequately applied to the inner or mounting ends of the spindles, such that those ends of the spindles are still not adequately moistened, and, as a result, the surface coating can build up on the mounting ends of the spindles, and reduce picking efficiency.

Accordingly, it would be desirable to provide an improved moistening pad holder and pad arrangement for a cotton harvester which facilitates and provides the required moistening fluid delivery to the inner or mounting ends of the spindles and overcomes the other shortcomings and problems discussed above.

SUMMARY OF THE INVENTION

According to the invention, an improved holder for supporting a moistening pad over a cotton picker spindle of a cotton harvesting unit for applying a moistening liquid directly and specifically to the mounting or inner end of the picker spindle when in the moistening location with the free end of the spindle at a forward end of the moistening location and the mounting end at a rearward end thereof, is disclosed. The moistening pad has a rearward end including at least one passage or hole therethrough, and is positioned by the pad holder in a predetermined position over the rearward end of the moistening location for contacting the mounting end of the spindle for applying the moistening liquid thereto. The holder includes a mounting element for mounting to a support element of the harvesting unit and a pad support element for holding the pad with the rearward end thereof in the predetermined position over the rearward end of the moistening location when the holder is mounted to the support element, the pad support element importantly including a drip edge or element positioned so as to be located over the rearward end of the pad when held by the pad support element for forming and dripping or similarly directing droplets of the moistening liquid onto the rearward end of the pad. A conduit is provided for carrying the moistening liquid from a source thereof to the drip edge and can have a special shape for facilitating flow of the moistening liquid to the drip edge and the operation thereof.

The drip edge preferably has a chisel shape, and the conduit preferably includes a terminal end portion which terminates at the drip edge for carrying the moistening liquid thereto, the terminal end portion being oriented at a small acute angle to horizontal so as to slope or extend downwardly toward the drip edge. The preferred shape of the drip edge having a concave shape characterized as the shape formed when a passage of circular cross section intersects a planar surface at an acute angle to the surface.

A preferred moistening pad has a rearward end positioned so as to be located over the rearward end of the moistening location when the holder is mounted to the support element of the harvesting unit, the rearward end of the pad having an upwardly facing surface including a channel located beneath the drip edge in position for receiving the droplets of the moistening liquid dripped therefrom, an opposite downwardly facing wiping face for contacting the mounting end of the spindle when in the moistening location, and at least one passage extending through the rearward end of pad from the channel to the wiping face for flow of the moistening liquid from the channel to the wiping face.

The pad can also optionally have a forward end positioned to be located over the forward end of the moistening location when the holder is mounted to the support element of the harvesting unit, the forward end of the pad having an upper surface including a forwardly extending forward channel extension connected to the channel of the rearward end of the pad and an opposite wiping face for contacting the distal end of the spindle when in the moistening location, at least one passage through the pad connecting the forward channel extension to the wiping face, and an upwardly extending dam located between the channel and the forward channel extension, the dam having a predetermined height or upward extent relative to the channel so as to prevent passage of the liquid from the channel to the forward channel extension when a level of the liquid in the channel is at or below a predetermined level required for flow over the predetermined height or upward extent.

Using the present moistening pad holder and the preferred moistening pad, the moistening liquid is directed specifically and directly to the mounting or inner end of the spindles, via the location of the drip edge of the pad holder and the channel of the rearward end of the pad.

BRIEF DESCRIPTION OF THE DRAWINGS

A non-limiting embodiment of the present invention will be described by way of example with reference to the accompanying drawings, in which:

FIG. 3 is a fragmentary bottom view of a pad holder of FIG. 2;

FIG. 4 is a top view of a pad of FIG. 2;

FIG. 5 is a sectional view of a pad holder of FIG. 2, showing the pad in position above a moistening location for moistening a spindle shown in phantom;

DETAILED DESCRIPTION OF THE INVENTION

Figure 1:
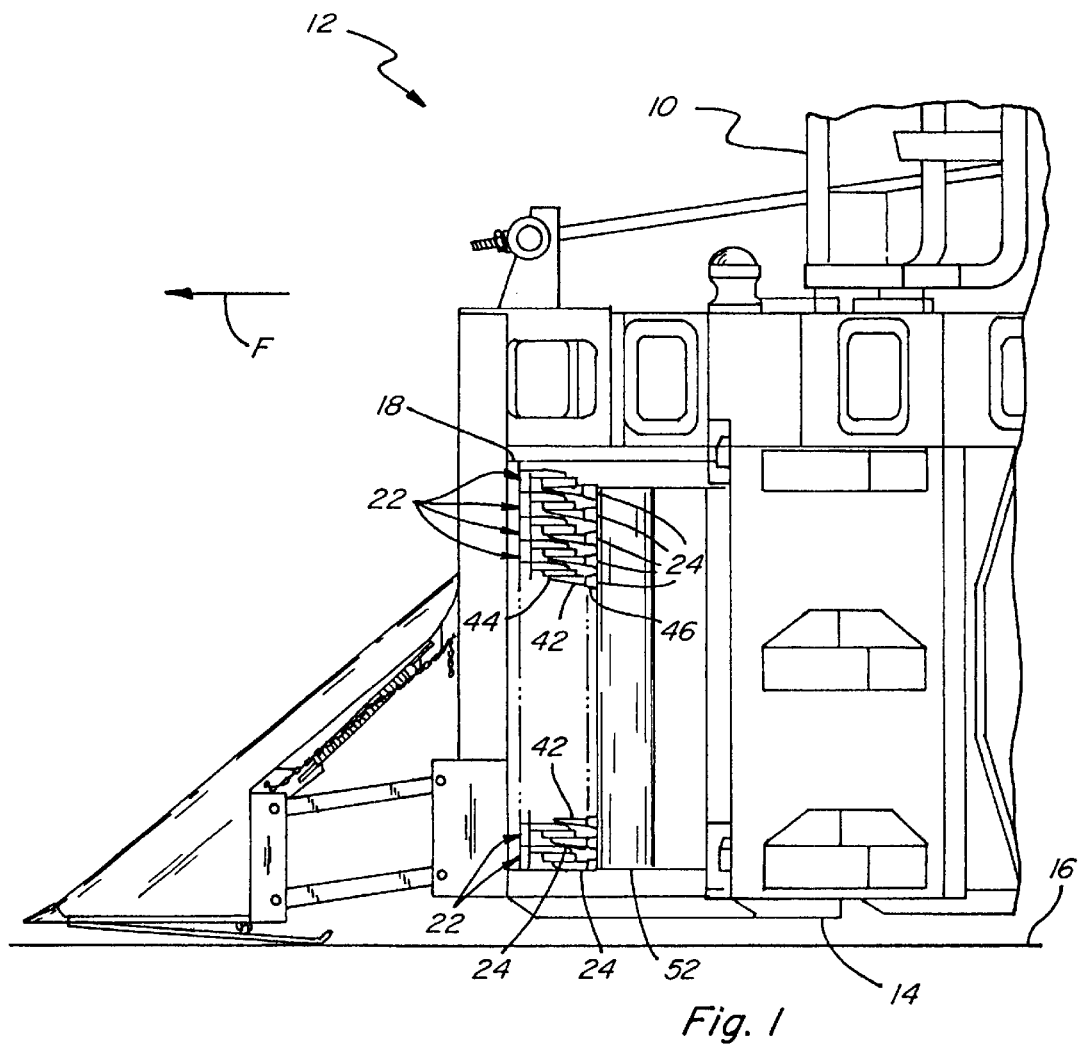
FIG. 1 is a fragmentary side elevational view of a forward end of a representative cotton harvester showing an exemplary harvesting row unit thereof.

Referring now to the drawings, wherein several preferred embodiments of the present invention are shown, FIG. 1 shows a forward end 10 of a conventionally constructed and operable cotton harvester 12, including an exemplary cotton harvesting row unit 14 thereof movable over the ground 16 in a forward direction denoted by arrow F for picking cotton from cotton plants (not shown) in the well known manner.

Figure 2:
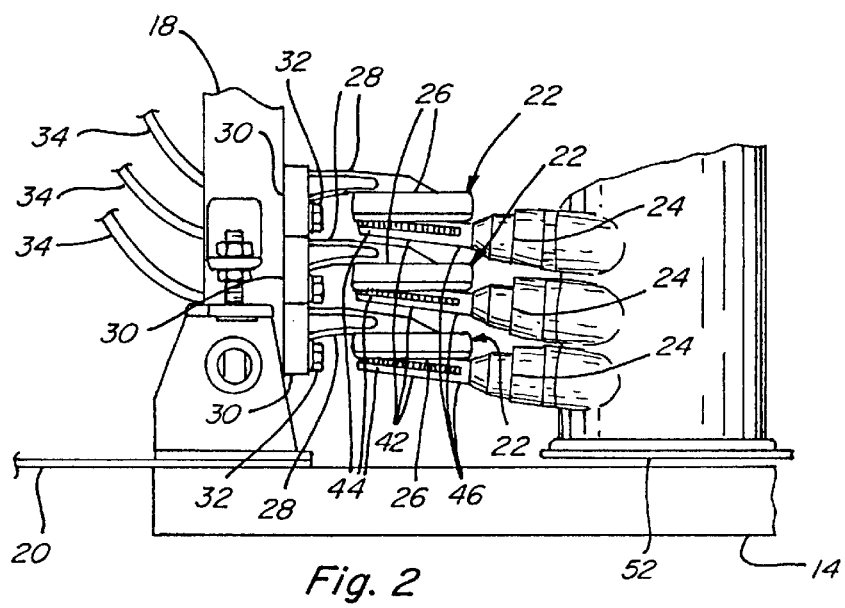
FIG. 2 is a fragmentary side elevational view of a cotton picking mechanism of the harvesting row unit of FIG. 1, showing a plurality of cotton picker spindles thereof at moistening locations within the unit and showing moistening pad holders and pads supported above the respective moistening locations in positions for applying moistening liquid to the spindles according to the present invention.

Referring also to FIG. 2, row unit 14 includes an upright moistener stand 18 located in an interior space of a cabinet 20, supporting a plurality of moistening pad assemblies 22 arranged in a row spaced one above the other over a corresponding plurality of cotton picker spindles 24 in position for contacting and moistening the respective picker spindles 24 in a moistening location as shown. Each moistening pad assembly 22 includes a moistening pad 26 of a plastics or rubber material preferably having a flange or other element engageable with a lip around a region of an arm 28 of a rigid plastics or metal pad holder 30, for mounting pad 26 to holder 30 in the conventional manner. Each holder 30 is mounted individually to moistener stand 18 with bolts 32 threadedly received in threaded apertures (not shown) in stand 18 also in the conventional manner.

Referring also to FIGS. 3 and 5, each moistening pad such as pads 26 shown preferably receives a metered or measured amount of a moistening liquid typically composed mostly of water from a conventional source such as a well known moisture distributor cup (not shown) via a conduit including a moistening liquid carrying line 34 extending from the source to a fluid inlet 36 on pad holder 30, and a conduit 38 connected to inlet 36 and extending through arm 28 to an outlet 40 located just above the moistening pad.

Referring more particularly to FIGS. 1, 2, and 5, picker spindles 24 are each shown at or in a moistening location 42 having a forward end 44 and an opposite rearward end 46, it being noted that the notations "forward end" and "rearward end" being selected for convenience only due to the forward to rearward orientation of the moistening locations within row unit 14 with respect to the forward and rearward ends of representative harvester 12, it thus not being intended that these terms be limiting for purposes of applying the present invention to other row units wherein the moistening locations and the picker spindles when therein may be differently oriented, for instance, sidewardly. Additionally, it should be noted that picker spindles 24 are not stationary but are moving through their respective moistening locations 42, here, in a generally side to side direction through moistening locations 42 with respect to direction F, it also being contemplated that this is not to be interpreted as limiting for the purposes of the present invention.

Each picker spindle 24 when in and moving through moistening location 42 is oriented so as to have a free or distal end 48 located at or in forward end 44 of moistening location 42, and an opposite inner or mounting end 50 located at or in rearward end 46 of the moistening location 42, as shown in FIG. 5. Picker spindles 24 are each attached by mounting end 50 thereof on a picker bar 52 movable in the well known manner along a predetermined, generally horizontal circuitous path through row unit 14, so as to carry picker spindles 24 through their respective moistening locations 42. It should be noted that during operation, row units 14 of cotton harvester 12 are often tilted by a few degrees downwardly in the forward direction relative to the substantially horizontal orientation shown in FIGS. 1 and 2. This results in moistener stand 18, and thus pad 26 and pad holders 30, being tilted forwardly and downwardly as will be illustrated and discussed below. Such tilting is significant because the moistening liquid exiting from outlet 40 of individual pad holders 30 to pads 26 is desirably flowing at a slow, drip rate, that is, a rate sufficiently small to exit outlet 40 in droplets, such that the amount of the moistening liquid ultimately applied to picker spindles 24 is correspondingly small, enough to allow pads 26 to cleanse and sufficiently wet spindles 24 for optimum affinity to the cotton, yet not so much as to add significant moisture to the cotton. The problem encountered with known pad and pad holder arrangements is that when such low flow rates are attempted, due significantly to such tilting and also the typical forward or central location of the liquid outlet of the known pad holders, the moistening liquid exits from the outlet and drops onto a correspondingly central or forward region of the pad, and, due to the small amount of the liquid, passes only through the holes or passages through the pad in that same region or downhill from the point of contact of the liquid with the pad, and thus does not effectively reach the inner or mounting end 50 of spindle 24 even if holes or passages through the pad over that portion of the spindle are present. This is problematic, as it has been found that, over time, the mounting ends of spindles 24 accumulate dirt and a rough, hard surface coating, resulting in picking efficiency being negatively affected.

To overcome this problem, arm 28 includes a drip edge 54 located so as to be over rearward end 46 of moistening location 42 in position for receiving the flow of the moistening liquid exiting from outlet 40, and forming the exiting liquid into droplets which are suspended and drop from drip edge 54 onto pad 26. Referring also to FIG. 4, pad 26, in turn, has a rearward end 56 located over rearward end 46 of moistening location 42 including an upwardly facing surface 58 having a forward to rearwardly extending channel 60 therein positioned beneath drip edge 54 for receiving the falling droplets of the moistening liquid, and at least one hole or passage 62 extending through pad 26 over rearward end 46, between channel 60 and an opposite downwardly facing wiping face 64, for conveying the received liquid to a rearward end 66 of wiping face 64 for application to mounting end 50 of spindle 24 when located at or in rearward end 46 of moistening location 42. In pad 26 shown, channel 60 extends substantially the entire forward to rearward length of rearward end 56, channel 60 having a forward end 68 enclosed by a dam 70 which has a predetermined height or upward extent as measured from a bottom of channel 60, as denoted by H. Pad 26 includes an optional forward to rearward extending forward channel extension 72 in surface 58 which connects with channel 60, dam 70 being disposed between channel 60 and extension 72 to allow passage of the moistening liquid from channel 60 to forward channel extension 72 only when the level of the liquid in channel 60 sufficiently exceeds the upward extent or height H of dam 70 so as to be capable of flowing thereover. This ensures flow of the moistening liquid through passages 62 to mounting end 50 of spindle 24, prior to any moistening liquid being directed to other regions of spindle 24, unless passages 62 become clogged. Here, it should be recognized that the ability of the liquid to flow over dam 70 will be affected or a function of the viscosity of the liquid and surface tension, as well as the tilt or incline of pad 26 relative to horizontal (if any), all of which factors can be determined. The size of passages 62 and their number and proximity to the region directly beneath drip edge 54 will also be factors, as will the rate of liquid flow through conduit 38 to drip edge 54. Pad 26 includes a plurality of optional additional passages 74 therethrough between front channel 72 and a central portion and a forward end of wiping face 64, for flow of the moistening liquid thereto when present in front channel 72, although, as noted above, it is the principal intent to deliver the liquid through passages 62 so as to be applied to mounting end 50 of spindle 24. Whether channel 60 ends at about the location of dam 70 or optional dam 70 is employed in connection with optional forward channel extension 72, the effect is that the moistening liquid is applied to mounting end 50, regardless of the presence of the normal forward and downward operating tilt of row unit 14 and pads 26. This has been found to provide adequate moistening of spindles 24, as the moisture has a tendency to migrate or move from mounting end 50 toward distal end 48 primarily due to gravitational and centrifugal forces.

It should be noted here that in the present embodiment drip edge 54 has a chisel shape cross section when viewed from the side and a concave shape when viewed from the top or bottom, these shaped having been found to be advantageous for forming the droplets of the moistening liquid in the desired shape and size and for directing and depositing the droplets into channel 60 for flow through the proximate passages 62, even when harvester 12 is tilted to one side. This shape is also conveniently formed by the intersection of conduit 38 and the generally planar underside surface of arm 28.

Figure 7:
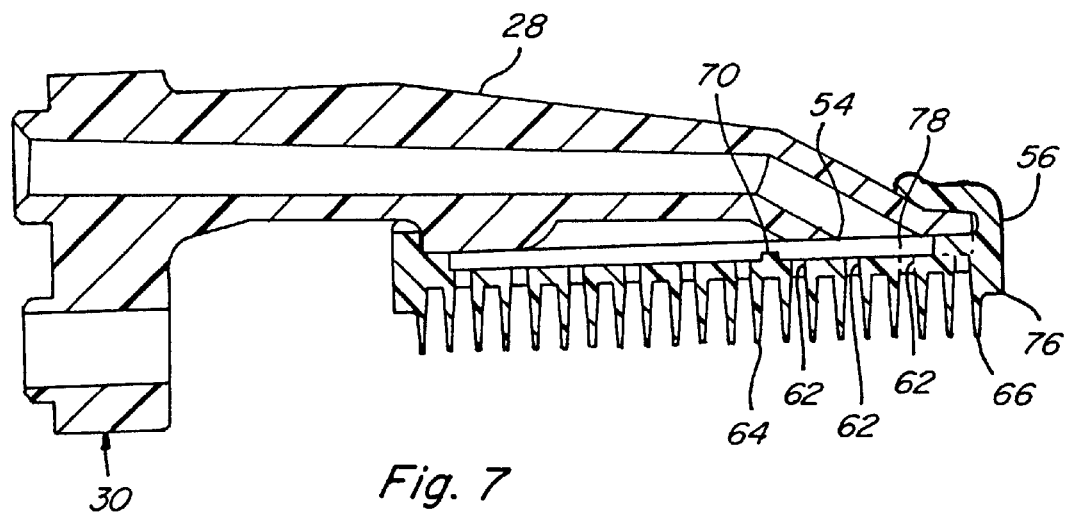
FIG. 7 is a sectional view of the pad of FIG. 6 shown on a pad holder of FIG. 2 also shown in section.
Figure 6:
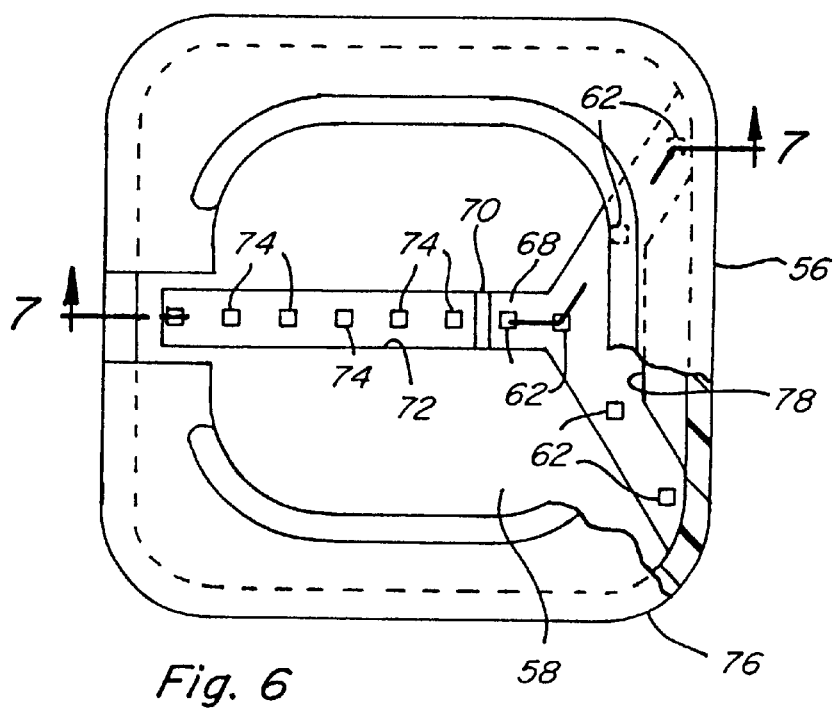
FIG. 6 is a top view of another pad according to the present invention.

Referring now to FIGS. 6 and 7, another moistening pad 76 constructed and operable according to the teachings of the present invention is shown, like parts of pad 76 and pad 26 being identified with like numbers. Pad 76 mounts on arm 28 of pad holder 30 in the above-described manner and includes a channel 78 on or in a surface 58 of a rearward end 56 of pad 76, channel 78 differing from previously described channel 60 in that channel 78 extends sidewardly in both directions toward corners of rearward end 56 so as to have a generally Y shape when viewed from the top. A plurality of passages 62 extend from channel 78 through pad 76 to a rearward end 66 of a wiping face 64 of pad 76 for application of the moistening liquid to mounting end 50 of spindles 24 when in the rearward end of the moistening location, as described above. Channel 78, like channel 60, is located directly beneath drip edge 54 so as to receive the droplets of the moistening liquid released therefrom, also in the above-described manner. Also like previously described pad 26, pad 76 has a channel 60 having a forward end 68 enclosed by a dam 70 having a predetermined height or upward extend, and an optional forward to rearward extending forward channel extension 72 on or in surface 58 which connects with channel 60 and includes passages 74 communicating with wiping face 64, dam 70 being disposed between channel 60 and extension 72 to allow passage of the moistening liquid from channel 60 to forward channel extension 72 only when the level of the liquid in channel 60 exceeds the upward extent or height of dam 70 to the required extent for flow thereover. This again ensures flow of the moistening liquid through passages 62 to mounting end 50 of spindles 54, prior to any moistening liquid being directed to other regions of spindle 24, unless passages 62 are clogged. In this respect, it is expected that the provision of a greater number of passages 62 through rearward end 66 of pad 76 at different front to rear locations, as a result of the Y shape of channel 78, will facilitate continued flow of the moistening liquid to mounting end 50 of spindles 24, even in the event several of passages 62 more proximal to drip edge 54 become clogged.

Figure 8:
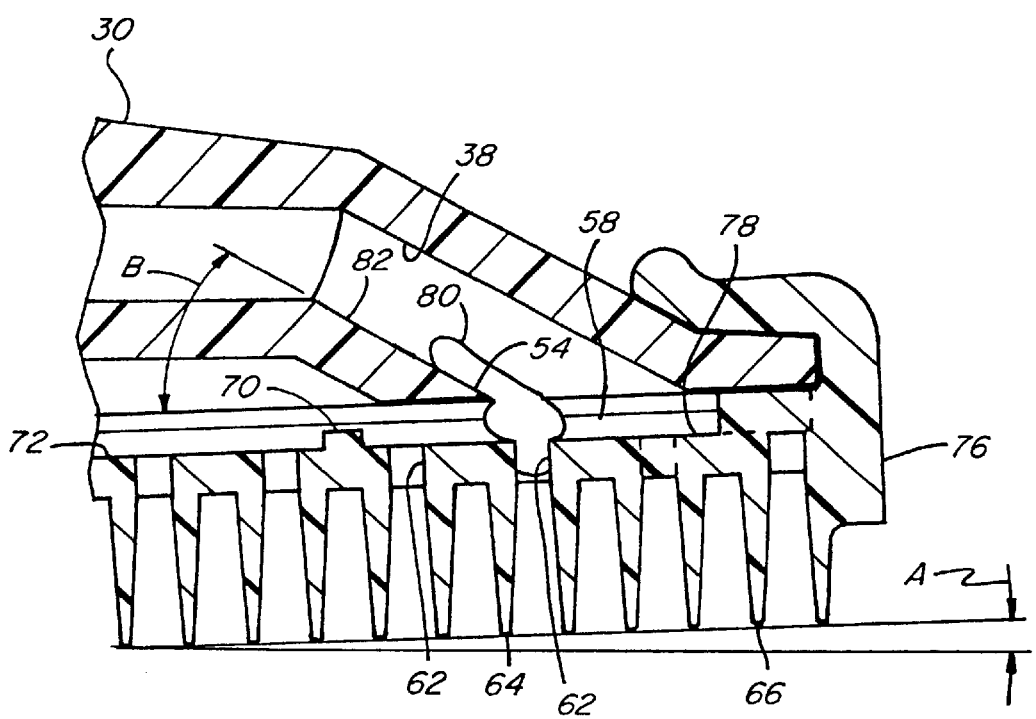
FIG. 8 is an enlarged, fragmentary, sectional representation of the pad and pad holder of FIGS. 6 and 7, illustrating flow of moistening liquid therein.

To illustrate, in FIG. 8, moistening pad 76 is shown supported on pad holder 30 and inclined at a small acute angle relative to horizontal, denoted by angle A, which is representative of angles of inclination of a row unit, such as row unit 14, during the harvesting operation. A droplet of moistening liquid 80 is shown on drip edge 54 dripping downwardly onto surface 58 of pad 76 and through the immediately adjacent passage 62 in communication with rearward end 66 of wiping face 64, enroute to the mounting end of a picker spindle and contact therewith (not shown). Here, it should be noted that conduit 38 has a terminal end portion 82 which is inclined downwardly at an acute angle to the mounting surfaces of pad holder 30 which is representative of horizontal when the row unit is horizontal, which angle is denoted by angle B, terminal end portion 82 terminating at drip edge 54. An angular inclination such as this has been found to facilitate flow of the moistening liquid to drip edge 54, at least in part by compensating for or offsetting to some extent, forward and downward inclination of pad holder 30, as illustrated by angle A. Terminal end 82 additionally has a concave shape corresponding to the concave shape of drip edge 54, as best shown in FIG. 3, so as to effectively form a continuous chute or channel for guiding the deposition of droplets 80 into a central region of channel 78 of pad 76 shown, and also channel 68 of pad 26 when that pad is used. Additionally, it should be observed that by the placement of dam 70 as shown or by otherwise terminating channel 78 at about the location of dam 70, droplets of the moistening liquid will be retained in position for flow through the rearwardly located passages 62, including those nearer the corners of pad 76, as opposed to being allowed to pass through the pad at a more forwardly location.

It will be understood that changes in the details, materials, steps, and arrangements of parts which have been described and illustrated to explain the nature of the invention will occur to and may be made by those skilled in the art upon a reading of this disclosure within the principles and scope of the invention. For instance, drip edge 54 may have other shapes such as a greater or lesser concave shape or a flat shape when viewed from above and below, and/or more or less of a chisel shape, as desired. Also, passages 62 of pads 26 and 76 may be greater or smaller in number and size, and differently located, while still remaining through the rearward end of the pad. Different heights of dam 70 may also be required for different applications and for use with different moistening liquids. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A holder for supporting a moistening pad over a cotton picker spindle of a cotton harvesting unit for applying a moistening liquid to the spindle when the spindle is in a predetermined moistening location during operation of the harvesting unit, the spindle including a mounting end and an opposite free end, the spindle being oriented when at the moistening location with the free end at a forward end of the moistening location and the mounting end at a rearward end thereof, the moistening pad having a rearward end to be disposed in a predetermined position over the rearward end of the moistening location for contacting the mounting end of the spindle for applying the moistening liquid thereto, the holder comprising:

a mounting element for mounting to a support element of the harvesting unit; and a pad support element for holding the pad with the rearward end thereof in the predetermined position over the rearward end of the moistening location when the holder is mounted to the support element, the pad support element including a drip edge positioned so as to be located over the rearward end of the pad when held by the pad support element for forming and dripping droplets of the moistening liquid onto the rearward end of the pad; and a conduit for carrying the moistening liquid from a source thereof to the drip edge.

2. The holder of claim 1 wherein the drip edge has a chisel shape.

3. The holder of claim 1 wherein the conduit includes a terminal end portion which terminates at the drip edge for carrying the moistening liquid thereto, the terminal end portion being oriented at an acute angle to horizontal so as to extend downwardly toward the drip edge.

4. The holder of claim 1, further comprising a moistening pad on the holder, the pad having a rearward end positioned so as to be located over the rearward end of the moistening location when the holder is mounted to the support element of the harvesting unit, the rearward end of the pad having an upwardly facing surface including a channel located beneath the drip edge in position for receiving the droplets of the moistening liquid dripped therefrom, an opposite downwardly facing wiping face for contacting the mounting end of the spindle when in the moistening location, and at least one passage extending through the rearward end of pad from the channel to the wiping face for flow of the moistening liquid from the channel to the wiping face.

5. The holder of claim 4, wherein the pad has a forward end positioned to be located over the forward end of the moistening location when the holder is mounted to the support element of the harvesting unit, the forward end of the pad having an upper surface including a forward channel extension connected to the channel of the rearward end of the pad and an opposite wiping face for contacting the distal end of the spindle when in the moistening location, at least one passage through the pad connecting the forward channel extension to the wiping face, and an upwardly extending dam located between the channel and the forward channel extension, the dam having a predetermined upward extent relative to the channel so as to prevent passage of the liquid from the channel to the forward channel extension when a level of the liquid in the channel is at or below a predetermined level relative to the upward extent.

6. The holder of claim 1 wherein the drip edge has a concave shape.

7. A moistening assembly for applying a moistening liquid to cotton picker spindles of a cotton harvesting unit when the spindles are moved through a predetermined moistening location within the unit during operation thereof, each of the spindles including a mounting end and an opposite distal end, each of the spindles being oriented when moved through the moistening location such that the distal end is moved through a forward end of the moistening location while the mounting end is moved through a rearward end of the moistening location, the moistening assembly comprising:

an arm adapted to be mounted to a support element of the harvesting unit so as to be located above the moistening location, the arm including a portion positioned to be disposed above the rearward end of the moistening location, the arm portion including a drip edge for receiving a regulated flow of the moistening liquid and dripping the liquid as stream of droplets above the rear end of the moistening location;

a conduit connectable to a source of the moistening liquid and including an outlet located adjacent to the drip edge for carrying the flow of the moistening liquid thereto; and a moistening pad supported on the arm including a rear end portion having a wiping face oriented so as to face downwardly over the rear end of the moistening location when the arm is mounted to the support element for contacting the mounting ends of the spindles when moved through the rear end of the moistening location for applying the moistening liquid thereto, the rear end portion having an upwardly facing face opposite the wiping face including a channel positioned beneath the drip edge for receiving the droplets of the moistening liquid, and at least one passage extending through the pad between the channel and the wiping face for carrying the received moistening liquid to the wiping face, wherein the pad has a forward end positioned to be located over the forward end of the moistening location when the arm is mounted to the support element of the harvesting unit, the forward end of the pad having an upper surface including a forward channel extension connected to the channel of the rearward end of the pad and an opposite wiping face for contacting the distal end of the spindle when in the moistening location, at least one passage through the pad connecting the forward channel extension to the wiping face, and an upwardly extending dam located between the channel and the forward channel extension, the dam having a predetermined upward extent relative to the channel so as to prevent passage of the liquid from the channel to the forward channel extension when a level of the liquid in the channel is at or below a predetermined level relative to the predetermined upward extent.

* * * * *